(12) United States Patent
Berkovich et al.

(10) Patent No.: US 9,240,074 B2
(45) Date of Patent: Jan. 19, 2016

(54) NETWORK-BASED REAL TIME REGISTERED AUGMENTED REALITY FOR MOBILE DEVICES

(75) Inventors: Erez Berkovich, Kfar Biyalik (IL); Elon Littwitz, Misgav (IL); Avigdor Adler, Naharia (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 8 days.

(21) Appl. No.: 13/822,652

(22) PCT Filed: Oct. 6, 2011

(86) PCT No.: PCT/IL2011/000787
§ 371 (c)(1),
(2), (4) Date: Mar. 13, 2013

(87) PCT Pub. No.: WO2012/049674
PCT Pub. Date: Apr. 19, 2012

(65) Prior Publication Data
US 2013/0187952 A1    Jul. 25, 2013

(30) Foreign Application Priority Data
Oct. 10, 2010  (IL) .......................................... 208600

(51) Int. Cl.
*G09G 5/00*    (2006.01)
*G06T 19/00*    (2011.01)
*G01S 5/16*    (2006.01)
(Continued)

(52) U.S. Cl.
CPC ................. *G06T 19/006* (2013.01); *G01S 5/16* (2013.01); *G06T 7/20* (2013.01); *G06T 11/00* (2013.01); *H04N 1/00244* (2013.01); *H04N 1/32101* (2013.01); *H04N 1/32144* (2013.01); *H04W 4/02* (2013.01); *H04N 1/00307* (2013.01); *H04N 2201/0084* (2013.01); *H04N 2201/3245* (2013.01); *H04N 2201/3253* (2013.01); *H04N 2201/3273* (2013.01);
(Continued)

(58) Field of Classification Search
None
See application file for complete search history.

(56) References Cited

U.S. PATENT DOCUMENTS 5,907,626 A * 5/1999 Toklu et al. ................... 382/107
6,307,556 B1 10/2001 Ellenby et al.
(Continued)

OTHER PUBLICATIONS

Groshong, "Augmented reality telescope brings universe closer", 2006, URL: http://www.newscientist.com/article/dn8653-augmented-reality-telescope-brings-universe-closer.html#.VS0g0vIdXIJ.*
(Continued)

*Primary Examiner* — David H Chu
(74) *Attorney, Agent, or Firm* — Mark M. Friedman

(57) ABSTRACT

A method of operating a mobile device with a camera, a display and a position sensor to provide a display of supplementary information aligned with a view of a scene. One or more image obtained from the camera is uploaded to a remote server together with corresponding data from the position sensor. Image processing is then performed to track image motion between that image and subsequent images obtained from the camera, determining a mapping between the uploaded image and a current image. Data is then received via the network indicative of a pixel location for display of supplementary information within the reference image. The mapping is used to determine a corresponding pixel location for display of the supplementary information within the current image, and the supplementary information is displayed on the display correctly aligned with the view of the scene.

19 Claims, 5 Drawing Sheets

(51) Int. Cl.
  *G06T 11/00*   (2006.01)
  *H04N 1/00*   (2006.01)
  *H04N 1/32*   (2006.01)
  *H04W 4/02*   (2009.01)
  *G06T 7/20*   (2006.01)
  *H04W 4/00*   (2009.01)
  *H04W 64/00*   (2009.01)
  *H04W 88/02*   (2009.01)

(52) U.S. Cl.
  CPC ...... *H04N 2201/3278* (2013.01); *H04W 4/008* (2013.01); *H04W 64/00* (2013.01); *H04W 88/02* (2013.01)

(56) References Cited

U.S. PATENT DOCUMENTS

| | | | |
|---|---|---|---|
| 6,330,356 B1 | 12/2001 | Sundareswaran et al. | |
| 6,522,312 B2 | 2/2003 | Ohshima et al. | |
| 7,002,551 B2 | 2/2006 | Azuma et al. | |
| 7,046,214 B2 | 5/2006 | Ebersole et al. | |
| 7,113,618 B2 | 9/2006 | Junkins et al. | |
| 7,650,013 B2 | 1/2010 | Dietsch et al. | |
| 7,756,563 B2* | 7/2010 | Higgins et al. | 600/407 |
| 8,649,565 B1* | 2/2014 | Kim et al. | 382/106 |
| 2004/0051680 A1* | 3/2004 | Azuma et al. | 345/8 |
| 2005/0285878 A1 | 12/2005 | Singh | |
| 2007/0002759 A1 | 1/2007 | Diaz et al. | |
| 2007/0015997 A1 | 1/2007 | Higgins et al. | |
| 2007/0027591 A1 | 2/2007 | Goldenberg et al. | |
| 2007/0162942 A1 | 7/2007 | Hamynen et al. | |
| 2007/0164988 A1* | 7/2007 | Ryu et al. | 345/156 |
| 2008/0071559 A1 | 3/2008 | Arrasvuori | |
| 2008/0298689 A1 | 12/2008 | Ashbrook et al. | |
| 2010/0053164 A1* | 3/2010 | Imai et al. | 345/427 |
| 2010/0208033 A1* | 8/2010 | Edge et al. | 348/46 |
| 2010/0257252 A1* | 10/2010 | Dougherty et al. | 709/217 |
| 2010/0277504 A1* | 11/2010 | Song | 345/633 |
| 2011/0102460 A1 | 5/2011 | Parker | |
| 2011/0148922 A1* | 6/2011 | Son et al. | 345/633 |
| 2012/0019557 A1* | 1/2012 | Aronsson et al. | 345/633 |
| 2013/0328867 A1* | 12/2013 | Jung et al. | 345/419 |
| 2014/0028718 A1* | 1/2014 | Lindner | 345/633 |

OTHER PUBLICATIONS

Watson, "Night Vision Equipment: The Illuminating Work of NRC Aerospace", 2008, URL: https://www.helicoptersmagazine.com/index.php?option=com_author&name=Blair%20Watson.*

Ethan Eade et al, Scalable Monocular SLAM; Computer Vision and Pattern Recognition, 2006 IEEE Computer, Society Conference on (vol. 1 ), pp. 469-476.

Andrew J,Davison, Real-Time Simultaneous Localisation and Mapping with a Single Camera, Computer Vision, 2003. Proceedings. Ninth IEEE International Conference on , pp. 1403-1410 vol. 2.

R.P.Wildes et al, Video Georegistration: Algorithm and Quantitative Evaluation, Computer Vision, 2001. ICCV 2001. Proceedings. Eighth IEEE International Conference on (vol. 2 ), pp. 343-350 vol. 2.

Richard W. Cannata et al, Autonomous Video Registration Using Sensor Model Parameter Adjustments, Applied Imagery Pattern Recognition Workshop, 2000. Proceedings. 29th , pp. 215-222.

Dieter Koller et al, Real-time Vision-Based Camera Tracking for Augmented Reality Applications, VRST '97 Proceedings of the ACM symposium on Virtual reality software and technology, pp. 87-94.

R. Bruce Backman, Registration for Tactical Imagery: An Updated Taxonomy, Published by Weapons Systems Division, DSTO Defence Science and Technology Organisation Apr. 2006.

Koji Makitta, Shared Database of Annotation Information for Wearable Augmented Reality System, Graduate School of Information Science, Nara Institute of Science and Technology, 8916-5 Takayama, Ikoma, Nara, 630-0192 Japan, pp. 464-471 (XP-002408355). 2004.

* cited by examiner

NETWORK-BASED REAL TIME REGISTERED AUGMENTED REALITY FOR MOBILE DEVICES

FIELD AND BACKGROUND OF THE INVENTION

The present invention relates to augmented reality and, in particular, it concerns a system and method providing network-based real time augmented reality for mobile devices.

Augmented reality (AR) refers to a manner of presenting supplementary information or graphic content overlying and visually combined with a view of the real world, whether viewed directly or as images on a display. In the case of a directly viewed scene, the supplementary information is generally displayed via a transparent display arrangement. In the case of images viewed on a display, the supplementary content is generally combined on the same display.

A key issue in implementation of any AR solution is the resolution of registration achieved between the real world scene and the supplementary information. For low resolution AR, for example, where it is sufficient to provide a simple text label deployed in the general direction of features occupying a large part of the field of view, it is possible to implement a rudimentary AR system using GPS together with an inertial navigation system (INS) or another basic position sensor suite. An example of such an implementation is described in "*Shared Database of Annotation Information for Wearable Augmented Reality System*", Koji Makita et al., Graduate School of Information Science, Nara Institute of Science and Technology, 8916-5 Takayama, Ikoma, Nara, 630-0192 Japan, pp. 464-471 (XP-002408355). A range of commercial applications have recently become available for various smart-phone devices which provide AR functionality based on built-in position sensors. The performance of such applications is limited by the precision of the position sensors and the noise level in their readings.

In more demanding AR applications, it may be necessary to provide more precise registration of the supplementary information with the real world view than can be achieved using low-cost position sensors, for example, allowing the system to distinguish between two objects which appear small and close together in a sampled image. In order to achieve high resolution registration of the supplementary information to the real world, techniques have been developed based on image processing through which sampled images are registered to a geographic information system (GIS) including ortho-photo data. Examples of this technology may be found in R. P. Wildes et al., "*Video georegistration: algorithm and quantitative evaluation*", ICCV 2001, Vol. 2, pp. 343-350; and in R. W. Cannata et al., "*Autonomous video registration using sensor model parameter adjustments*", IEEE Workshop on Video Registration (with ICCV 2001).

Image-processing-based AR applications such as those described in these articles potentially offer accurate pixel-by-pixel registration to the geographic database, and hence provide precise positioning of supplementary AR information sufficient to identify all visible features. However, this approach requires access to a large database of reference images, and strong processing capabilities. In practical terms, the hardware requirements for implementing image-processing-based AR have until now been generally prohibitive for domestic consumer electronics devices and other portable devices. Furthermore, remote image processing is typically not an effective option for mobile devices networked via a wide area network (WAN) due to the significant delay introduced by uploading images over the limited bandwidth of the WAN.

There is therefore a need for a system and method providing network-based real time augmented reality for mobile devices which would allow image-processing-based AR to be used effectively within the processing and communication bandwidth limitations of networked portable devices.

SUMMARY OF THE INVENTION

The present invention is a system and method providing network-based real time augmented reality for mobile devices.

According to an embodiment of the present invention there is provided, a method of operating a mobile device to provide a display of supplementary information aligned with a view of a scene, the mobile device including a camera, a display and at least one position sensor, the mobile device being in networked communication to a remote server, the method comprising the steps of: (a) obtaining a first image from the camera; (b) uploading at least the first image to the remote server together with corresponding data from the at least one position sensor; (c) performing image processing to track image motion between the first image and subsequent images obtained from the camera, and hence determining a mapping between features of a reference image and features of a current image obtained from the camera, the reference image being selected from the group consisting of: the first image; and a second image for which transformation parameters were uploaded to the server corresponding to a mapping between the first image and the second image; (d) receiving via the network data indicative of a pixel location for display of supplementary information within the reference image; (e) employing the mapping to determine a corresponding pixel location for display of the supplementary information within the current image; and (f) displaying the supplementary information on the display correctly aligned with the view of the scene.

According to a further feature of an embodiment of the present invention, the mapping is a global spatial transformation approximating the image motion.

According to a further feature of an embodiment of the present invention, the mapping is an optical flow mapping.

According to a further feature of an embodiment of the present invention, the mapping is derived by simultaneous localization and mapping (SLAM) processing of the images.

According to a further feature of an embodiment of the present invention, the displaying includes displaying the supplementary information overlying an image of the view of the scene on a non-transparent display.

According to a further feature of an embodiment of the present invention, the displaying includes displaying the supplementary information on a transparent display aligned with a direct view of the scene.

According to a further feature of an embodiment of the present invention, the receiving includes receiving data indicative of a graphic form for display of the supplementary information.

According to a further feature of an embodiment of the present invention, the receiving includes receiving data indicative of a pixel location for display of supplementary information relating to an object obscured from view.

According to a further feature of an embodiment of the present invention, the pixel location for display of supplementary information received by the mobile device is derived at least in part by matching of the first image to a three dimensional model of the scene.

According to a further feature of an embodiment of the present invention, the image processing is continued after the displaying to generate an updated mapping for a new current image, and wherein the pixel location for display of the supplementary information within the current image is updated according to the updated mapping.

According to a further feature of an embodiment of the present invention: (a) a request is input from a user for information regarding a pixel location in the current image; (b) the mapping is employed to derive a corresponding pixel location in the reference image; and (c) a request is transmitted to the server for information regarding the pixel location in the reference image.

According to a further feature of an embodiment of the present invention, the request for information is a request for range information relating to a viewed location.

According to a further feature of an embodiment of the present invention: (a) a tracking reliability indicator is evaluated based upon at least one parameter selected from the group consisting of: elapsed time since sampling of the first image; degree of overlap between the current image and the first image; and number of tracked features in common between the current image and the first image; and (b) when the tracking reliability indicator passes a threshold, a new reference image obtained from the camera is uploaded to the server.

There is also provided according to an embodiment of the present invention, a mobile device for providing a display of supplementary information aligned with a view of a scene, the mobile device comprising: (a) a camera; (b) a display; (c) at least one position sensor; (d) a communication module for networked communication to a remote server; and (e) a processing system including at least one processor, the processing system being in data communication with the camera, the display, the at least one position sensor and the communication module, the processing system being configured to implement the aforementioned method.

According to a further feature of an embodiment of the present invention, the mobile device is implemented as a device selected from the group consisting of: an augmented reality headset; binoculars; a telescope; and night vision goggles.

According to a further feature of an embodiment of the present invention, the mobile device is implemented as a device selected from the group consisting of: a cellular telephone; a hand-held computer; a navigation device; a personal digital assistant; and a digital camera.

There is also provided according to an embodiment of the present invention, a method for supporting display on a mobile device of supplementary information aligned with a view of a scene, the method comprising the steps of: (a) receiving from the mobile device a first image obtained from a camera of the mobile device together with data indicative of a position of the mobile device when the first image was obtained; (b) generating an estimate of a field of view of the camera of the mobile device corresponding to the first image; (c) retrieving from a database at least part of a geographically anchored three-dimensional model corresponding to the estimate of the field of view; (d) co-processing the first image with the at least part of the three-dimensional model to derive a registration mapping for mapping pixels of the first image to the three-dimensional model; (e) determining a pixel location within the first image for display of at least one item of supplementary information within the first image; and (f) transmitting to the mobile device data indicative of the pixel location for display of the supplementary information.

According to a further feature of an embodiment of the present invention, data is transmitted to the mobile device sufficient for display of graphic content at the pixel location, the graphic content being warped to substantially conform to an apparent orientation of an object to which the supplementary information relates.

According to a further feature of an embodiment of the present invention, data is received from the mobile device indicative of an updated field of view of the camera, and wherein the supplementary information is retrieved from a database as a function of at least the updated field of view.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method providing network-based real time augmented reality for mobile devices.

The principles and operation of methods and systems according to the present invention may be better understood with reference to the drawings and the accompanying description.

Figure 1:
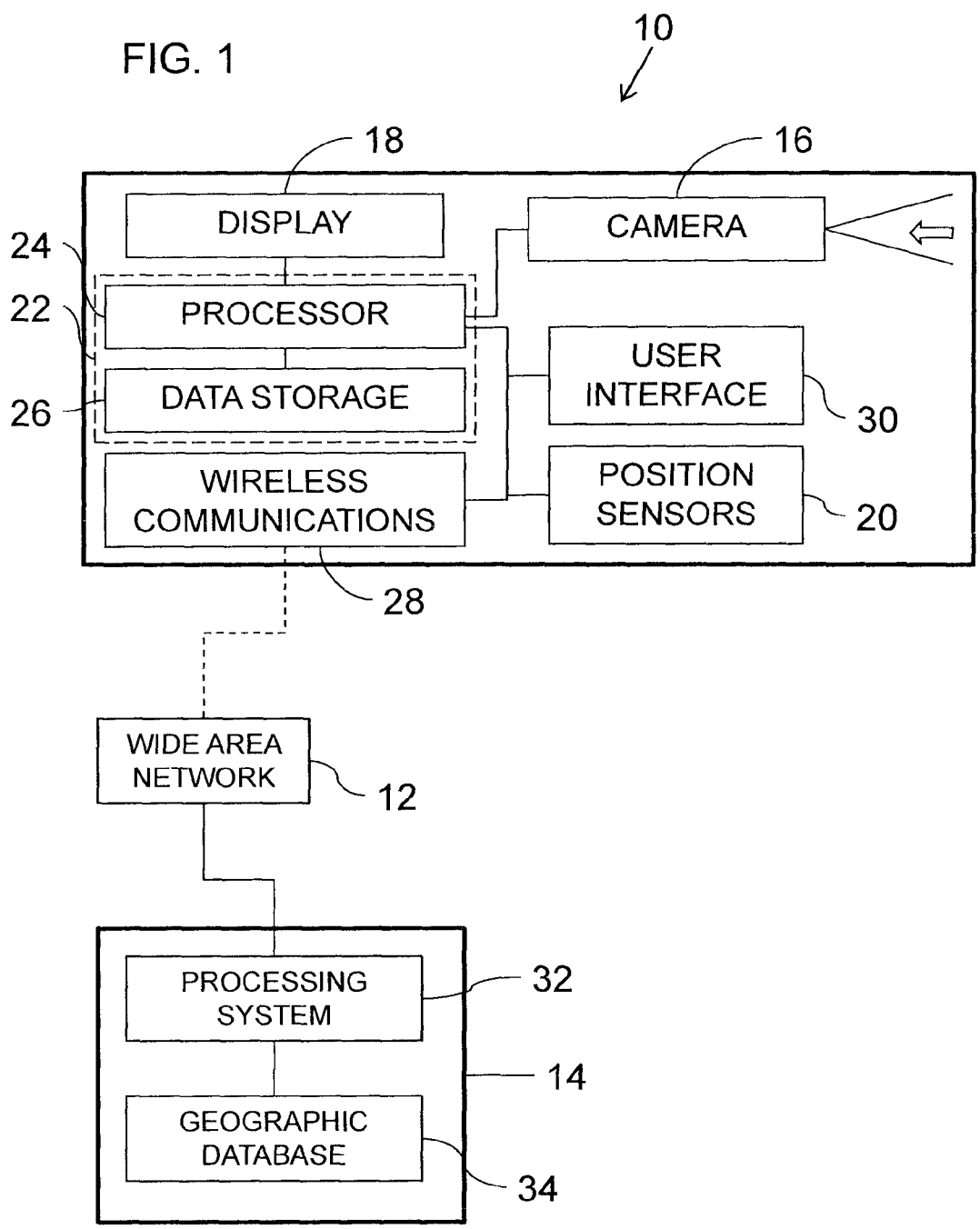
FIG. 1 is a schematic block diagram of a system according to an embodiment of the present invention for providing network-based real time augmented reality for a mobile device.
Figure 2:
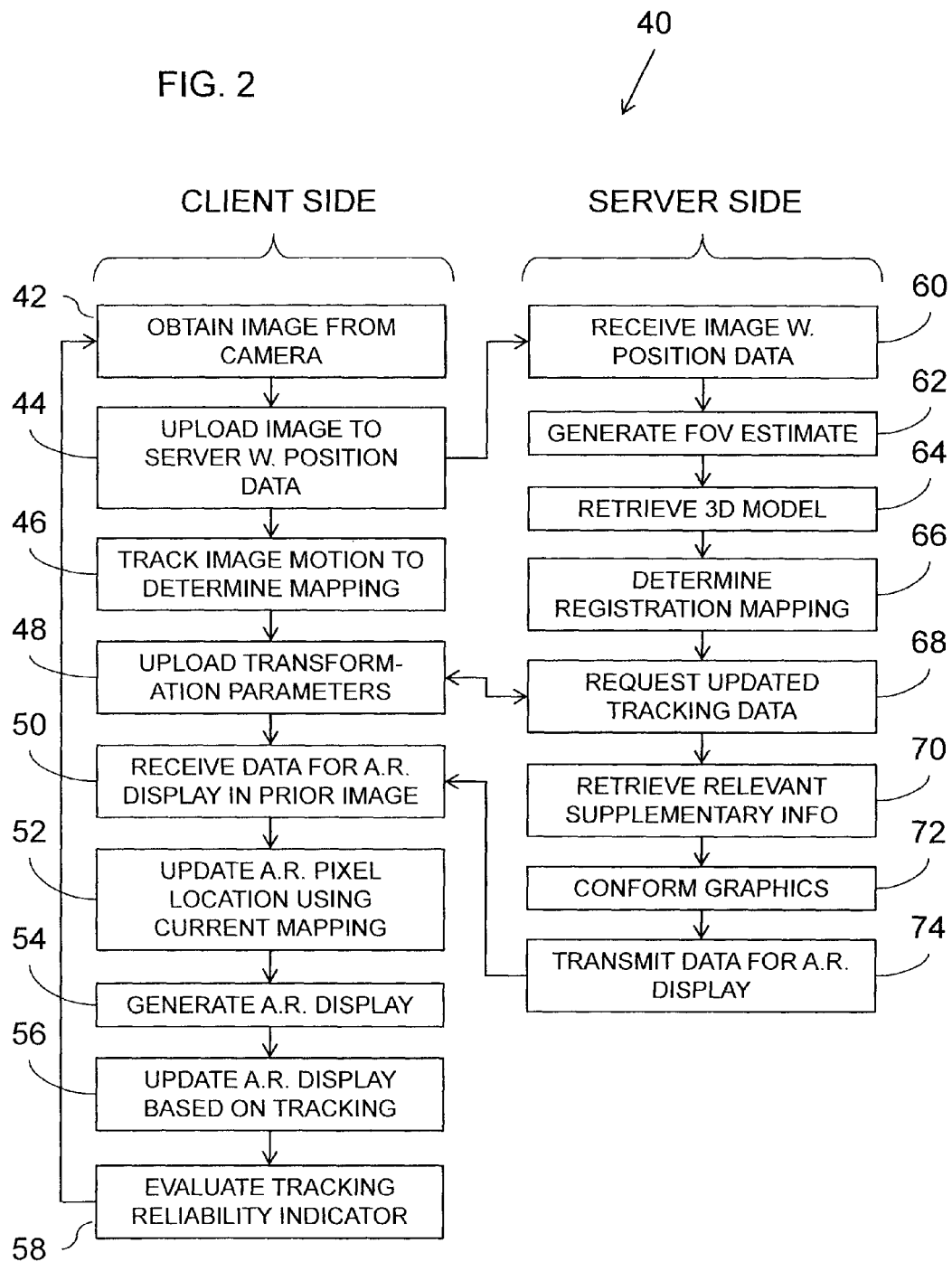
FIG. 2 is a schematic flow diagram illustrating the operation of the system of FIG. 1 according to an embodiment of the present invention.

Referring now to the drawings, FIG. 1 shows an overview of a system for providing network-based real time augmented reality for mobile devices according to an embodiment of the present invention, while FIG. 2 illustrates a mode of operation of the system, corresponding to a method according to an embodiment of the present invention.

Turning first to FIG. 1, there is shown a mobile device, generally designated 10, connected via a wide area network (WAN) 12 to a remote server 14, thereby forming a system suitable for implementing an embodiment of the present invention to provide a display of supplementary information aligned with a view of a scene.

In an embodiment as shown, mobile device 10 includes a camera 16, a display 18 and at least one position sensor 20, all connected in data communication to a processing system 22 (including at least one processor 24 and data storage 26). Also connected to processing system 22 is a wireless communications module 28 for networked communication via WAN 12 to remote server 14. A user interface 30 is typically provided to control the functions of the device.

Mobile device 10 as described may be implemented using a wide range of types of mobile device. Mobile device 10 may be a dedicated augmented reality device, or may be implemented based on various conventional portable electronic devices with suitable modification or addition of supplementary components where the necessary components are not already present. Examples of suitable devices include, but are not limited to:

- a cellular telephone or "smart phone";
- a hand-held computer;
- a navigation device;
- a personal digital assistant;
- a digital camera;
- an augmented reality headset;
- monocular and binoculars;
- a telescope;
- night vision goggles;
- head-up displays (HUD);
- helmet or head mounted displays (HMD); and
- other devices employing a transparent or see-through screens, that can be implemented for example using OLED technology.

Camera 16 may be any type of image sensor which provides an image of the scene viewed by the device. Examples include, but are not limited to, visible (VIS) color cameras (such as CCD or CMOS based cameras), near infrared (NIR) cameras, thermal cameras and multi-spectral or hyper-spectral cameras. Furthermore, in a preferred implementation of the present invention in which registration of the images is performed relative to a three-dimensional model of the environment, depth-sensing cameras such as LADAR may also be used. Optionally, more than one camera may be provided, such as for example a combination of a VIS color camera with a thermal camera to provide enhanced operation in both daytime and nighttime operation.

Display 18 may be any suitable display that can be used to show the supplementary information of the augmented reality display aligned with the scene. Implementations of mobile device 10 may be broadly subdivided into two categories, both schematically represented in FIG. 1: devices in which the user views the scene as an image displayed on display 18; and devices in which the user views the scene directly, e.g., through suitable optics. In the latter case, display 18 is implemented as a transparent display. The term "transparent display" is used in this context to refer generically to any display arrangement which allows simultaneous direct viewing of real scene, including but not limited to: a transparent display panel; an arrangement in which beam-splitting optics combines two views, and non-obscuring retinal projection systems. Where a transparent display is provided, the deployment of the display is chosen so as to allow the user to view the supplementary information displayed while simultaneously focusing on the more distant actual scene, as is well known in the art of transparent displays.

Position sensors 20 are preferably a combination of sensors which provide sufficient information to generate an initial estimate of camera pose. The term "position sensor" is used here to refer to any sensor which senses or derives either location or orientation of the camera or the mobile device as a whole. Examples of suitable sensors may include some or all of the following: a GPS receiver, accelerometers, tilt sensors and a digital compass. Although processing time at the server is optimally reduced by providing a relatively good estimate of camera location and orientation, the system can also operate with partial information, such as GPS location without orientation data, or with partial orientation data plus approximate location from interpolation from a cellular network. In certain cases, position sensors 20 may be omitted altogether, being replaced by externally provided data from another nearby mobile unit, from a cellular network or by manual entry of an approximate location or neighborhood.

Wireless communications module 28 may be any wireless communications interface providing a communications pathway to the WAN in which the server(s) are located. The most available interface in many environments today is a cellular communication system providing data communication linked to the Internet. Clearly, for specific applications, a dedicated communications network based on any suitable wireless technology may be used. Although the last leg of the communications to the mobile device is preferably wireless, all other parts of the communications chain may be implemented using any desired combination of wired and wireless connections.

The processing system 22 of mobile device 10 is configured, typically by suitable software loaded into involatile memory and executed by the processing system, rendering the mobile device effective to perform the client-side processing, corresponding to a method according to an embodiment of the present invention, as will be described below with reference to FIG. 2. It will be clear that alternative implementations employing dedicated hardware, or hardware-software combinations known as firmware, also fall within the scope of the present invention. Also falling within the scope of the present invention is code stored in a tangible computer-readable data storage medium and executable by the processor of a mobile device to cause the mobile device to perform the recited functions.

In an embodiment as shown, remote server 14 includes a processing system 32 and a geographic database 34, to be detailed further below with reference to FIG. 3.

Turning now to FIG. 2, this illustrates a mode of operation of the system, corresponding to a method 40 according to an embodiment of the present invention. Specifically, the left side of the Figure shows steps performed by the mobile device, acting as the "client", while the right side shows steps performed by the server.

It should be noted that, although shown here for simplicity of presentation as a single client process interacting with the server, the system architecture is particularly suited to providing parallel service from a single server or set of servers to multiple clients. In particular, since the calculationally heavy registration processing is performed only intermittently, as required by each client, and in a manner which is insensitive to minor delays, server processing resources can be dynamically reallocated to serve multiple clients in parallel.

Referring now to the client-side process of FIG. 2, a first image is obtained from the camera at step 42, and is uploaded to remote server 14 together with corresponding data from position sensors 20 (step 44) or some external source, as described above. The uploaded image will be processed by the server (to be described separately below) so as to achieve registration to a geographic database and provide data for correct alignment of AR information. However, the combined time of uploading the image and processing it at the server would introduce possibly large errors due to movement of the camera during the time lag.

It is a particularly preferred feature of an aspect of the present invention that the processing system of the mobile unit performs image processing to track image motion between the first image and subsequent images obtained from the camera, and hence determines a mapping (step 46) which can be used to compensate for the delay in obtaining the results of the registration processing from the server.

The phrase "tracking image motion" is used in this context to refer generically to a range of algorithms which allow association of pixels to pixels between spaced apart images in an image sequence. By way of specific non-limiting examples, the image motion tracking performed by mobile device 10 may be implemented according to any of at least three techniques, depending primarily upon the likely usage scenarios and the available processing resources of the device, as follows.

In a most basic implementation, particularly suited for situations where camera motion is primarily panning without significant ego-motion, image motion may be modeled by a global spatial transformation, such as an affine transformation. The term "global" here refers to a transformation which is applied uniformly to the entire image as a unit. Tracking for implementing such transformations may be performed by tracking relatively sparse features between successive images, as is well known in the art.

A second implementation option employs optical flow. This option is computationally heavier, but provides a more robust solution for cases where there is some translational motion of the camera. Optical flow processing for pairs or sequences of images is well known in the art, and will not be described here in detail.

A third option, relatively heavy in its computational burden, but even more robust for cases of a moving platform, is to employ monocular simultaneous localization and mapping (SLAM) processing. A discussion of suitable SLAM algorithms for use with a single camera may be found in the art, and for example in: A. Davison, "*Real time simultaneous localisation and mapping with a single camera*", ICCV, Nice, France, July 2003.

According to any of these options, the tracking process results in a transformation or mapping which allows pixel locations in a current image to be associated with corresponding locations in the first image and/or in an intermediate image. It should be noted in this context that the term "current image" is used to refer to an image sampled recently by the camera to form the basis for substantially real-time display of AR supplementary information. It should be noted that the "current image" may also be subject to processing delays of several frames, but is preferably still within the realm of what is considered acceptable as real time display, typically with a delay of significantly less than a second.

In the event that the field of view has shifted so dramatically that results of registration of the previously uploaded image may no longer be useful, the mobile device may send a cancellation notification to the server and restart the processing from step 42.

Optionally, at step 48, parameters resulting from the above tracking since sampling of the first image may be uploaded to the server, thereby providing an update to the server of the current field of view relative to the original field of view of the first image. This allows the server to select AR supplementary information which is still relevant to the current field of view if the field of view has changed since the first image was sampled. In many applications, step 48 is unnecessary.

At step 50, the mobile device 10 receives via the network data indicative of a pixel location for display of supplementary information within the first image, or an intermediate reference image. The mapping derived from the tracking process is then employed to determine a corresponding pixel location for display of the supplementary information within the current image (step 52). The term "pixel location" is used herein to refer to a location within an image defined relative to a grid of pixels. The location may be represented as a specific pixel address, as a group or region of pixels, or as some other geometrical relationship to one or more pixel location. The supplementary information is then displayed on the display correctly aligned with the view of the scene (step 54), either by displaying the supplementary information overlying an image of the view of the scene on a non-transparent display, or by displaying the supplementary information on a transparent display aligned with a direct view of the scene.

Optionally, at step 50, the server may provide the mobile device with the calculated registration transformation, which provides a precise geographical location for each pixel of the image. This may be used to enable additional functionality at the mobile device, for example, allowing identification of the geographical location of any point in the field of view for upload to the server or for transfer to another user, optionally with additional annotations. Alternatively, similar functionality may be provided by uploading a pixel location designation, with the corresponding geographical location derived by the server.

Although the aforementioned process can optionally be performed with a number of still images, preferred functionality is to display the AR supplementary information in a continuously updating manner based on continuous video imagery sampled by the camera. In this case, the local tracking processing is preferably continued while the AR display is operating to generate updated mappings for new current images as they become available, and the pixel location for display of the supplementary information within the current image is updated according to the updated mapping (step 56). This effectively keeps the AR content correctly positioned within the moving video image or changing field of view of a direct-viewing device.

The tracking processing performed at the mobile device provides a highly effective correction for maintaining correct positioning of AR content relative to the viewed scene, but does not provide a solution for complete shifts of field of view. Accordingly, the process of uploading an image to the server and receiving new data for accurate display of AR content must be repeated periodically. In some applications, it may be appropriate to simply repeat the upload and registration process at fixed intervals. However, in order to enhance efficient use of processing resources, the mobile device preferably evaluates a tracking reliability indicator to assess when the reliability of the tracking has dropped (step 58), and then initiates a new upload-and-registration process (steps 42-54) as needed. The tracking reliability indicator may be based upon one or more parameters such as: elapsed time since sampling of the first image; degree of overlap between the current image and the first image; and/or the number of tracked features in common between the current image and the first image. When the tracking reliability indicator drops below a given threshold, which may be predefined or dynamically varied based on operating parameters, operation returns to step 42, preferably while continuing to display the real time updated AR content until data based on the updated registration becomes available.

Figure 3:
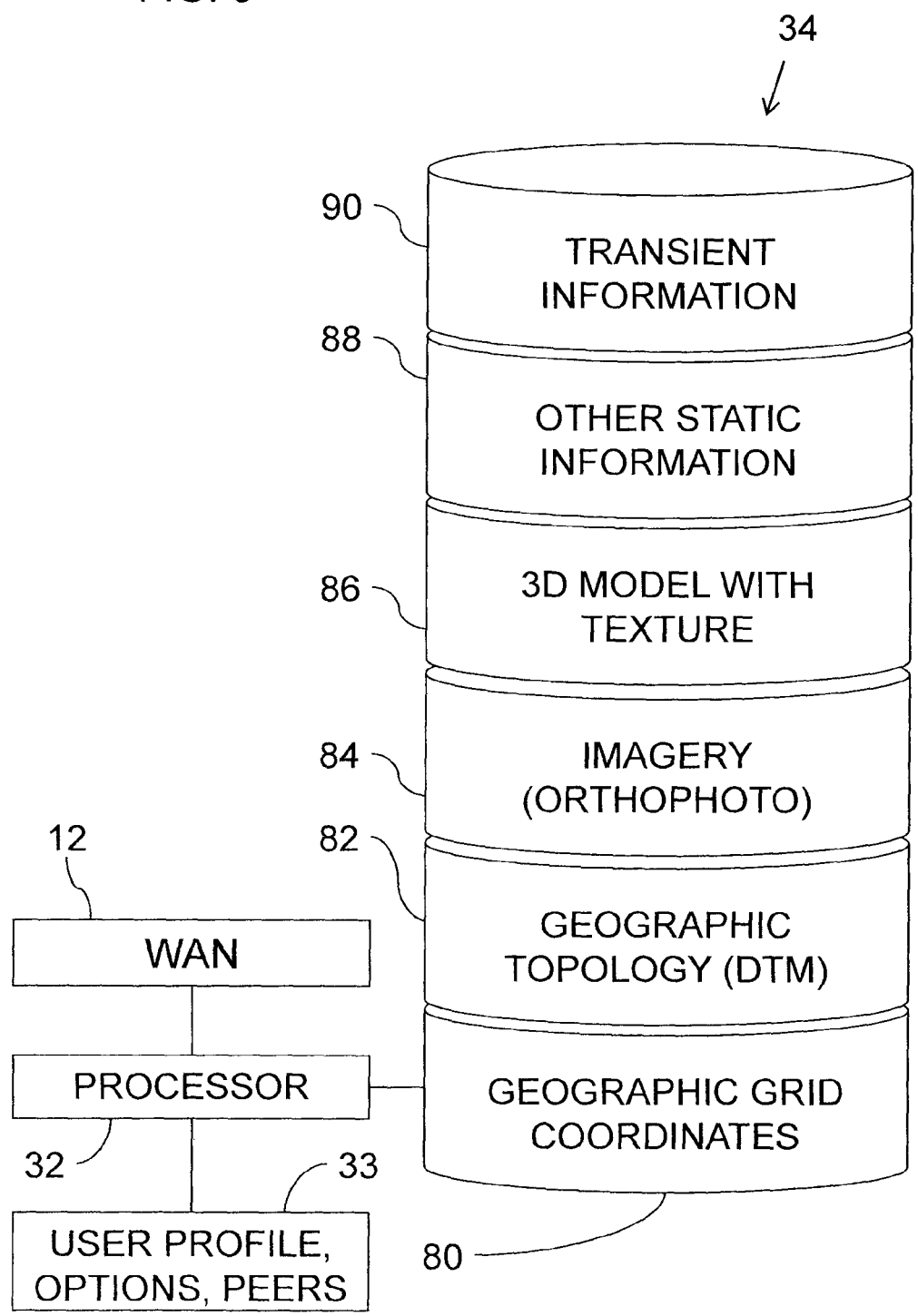
FIG. 3 is a schematic block diagram of the server side of the system of FIG. 1 according to an embodiment of the present invention.

Turning now to server 14, an implementation of the server is represented schematically in FIG. 3. As described above with reference to FIG. 1, one or more processors 32 are connected to WAN 12, which provide communication to the mobile devices. In one preferred but non-limiting embodiment, processors 32 are implemented as dynamically allocated processing resources from multiple computers distributed on a network according to a "cloud computing" model. Such services are well known in the art, and are commercially available from service providers such as GOGGLE® and AMAZON®. According to another preferred but non-limiting embodiment, processors 32 are part of a dedicated server system, which may be a stand-alone system or may be integrated with geographic database 34.

The AR service provided to each mobile device is most preferably personalized to the interests and needs of each user and/or by selection of various modes of operation. To this end, the server preferably stores a range of settings in some suitable data storage device 33 which maintain and update user profiles, individual settings, and preferably also identify groups of users as peers to whom mutual information may be provided subject to system and user privacy requirements. The system may also include modules for verifying authorization to use the system and/or taking payment, all as is standard for online service providers, and will not be detailed here.

Geographic database 34 itself may be a standard geographic information system (GIS), or a dedicated database, storing layers of information which are typically all anchored to geographic grid coordinates 80. Typical layers of information include, but are not limited to, one or more of the following: a digital terrain map (DTM) 82 identifying the geographic topology and corresponding imagery 84, typically from aerial or satellite sources, which is linked to the grid and adjusted to provide an orthogonal view at all locations ("orthophoto"); 3D models 86 of buildings and/or other structures, preferably with corresponding texture information. On top of these, the database preferably also stores various layers of other static information 88 and optionally also various transient information 90. In this context, "static information" is used to refer to any information which typically does not vary during the course of an augmented reality session, such as information about the identity, ownership, history, properties or functions of objects or locations in the 3D model. Conversely, "transient information" refers here to information, instructions or tasks which may change over relatively short time periods, or which are associated with a person, group or object which may move. Examples of transient information which may be relevant to certain embodiments of the present invention include, but are not limited to, the location and identity of (the users of) mobile devices, tracking information about vehicles (such as public transport), traffic congestion information and weather information, and a list or description of tasks to be accomplished collectively by a group.

Parenthetically, although typically implemented based on a geographic coordinates, it should be noted that implementations based on a model that is not geographically anchored may also be used, and may be sufficient particularly in well defined closed environments such as an indoor complex (e.g., within a museum or the like).

Turning now to the Server Side of FIG. 2, server 14 receives from mobile device 10 the uploaded image obtained from camera 16 together with data indicative of a corresponding position of the mobile device when the image was obtained (step 60). The position data is then employed to generate an estimate of a field of view (FOV) of the camera of the mobile device corresponding to the first image (step 62), which is used as a basis for retrieving from database 34 at least part of a geographically anchored three-dimensional (3D) model corresponding to the estimate of the field of view (step 64).

Where the position data is sufficient, for example, including estimated parameters for the location, direction and orientation of the camera, the FOV estimate may be relatively specific, allowing highly selective retrieval from database 34 of data likely to be included within the FOV. In other cases, where only partial or very approximate position data is available, an extended region of the model may need to be retrieved to ensure availability of sufficient data to achieve registration. Clearly, when image registration is repeated for subsequent images from the same locality (either from the same mobile device or another device), the retrieval step is only performed as required, and some or all of the required data may already be locally cached and available for use.

The 3D model may be a relatively low-resolution model such as a digital terrain map (DTM) of geographic topology, commonly used as a basis for processing based on orthophoto imagery, or may be a higher resolution model including features of specific buildings and other landmarks. Optionally, data from more than one model or type of model may be used. The model is preferably supplemented by associated imagery or texture data which is also used in the subsequent registration process. Suitable models may be derived by a range of known techniques including, but not limited to, stereoscopic pair image processing, structure-from-motion (SFM) processing, and bundle adjustment for 3D reconstruction. The model may optionally be supplemented or updated on the basis of the uploaded images from some or all of the mobile devices using the system.

Then at step 66, the server co-processes the uploaded image with the potentially relevant portion of the three-dimensional model to derive a registration mapping for mapping pixels of the first image to the three-dimensional model. Processing to determine a registration mapping between 2D images and a 3D model is well known in the art, and will not be described here in detail. Non-limiting example of suitable techniques for determining such a mapping may be found in: (A) R. P. Wildes, D. J. Hirvonen, C. S. Hsu, R. Kumar, W. B. Lehman, B. Matei & W.-Y. Zhao (Sarnoff), "*Video georegistration: algorithm and quantitative evaluation*", ICCV 2001, Vol. 2, pp. 343-350; (B) R. W. Cannata, M. Shah, S. G. Blask & J. A. Van Workum (Harris Corp. and Univ. of Central Florida), "*Autonomous video registration using sensor model parameter adjustments*", IEEE Workshop on Video Registration (with ICCV 2001); and (C) "*Registration for Tactical Imagery: An Updated Taxonomy*", R. Bruce Backman, chapter 3.3, Australian Government Department of Defence DSTO Technical Report No. DSTO-TR-1855.

As mentioned earlier in the context of client-side step 48, in order to supply supplementary information relevant to the current FOV of the mobile device, at step 68, according to certain implementations of the present invention, the server transmits a request to the mobile device for updated tracking data indicative of an updated field of view of the camera. Additionally or alternatively, the mobile device may provide updates to the server, either periodically or when a significant shift in FOV occurs. In alternative implementations, this update is omitted and the current FOV is assumed to be generally similar to the FOV of the original uploaded image, preferably with some extra margins around it.

At step 70 of the implementation as illustrated here, the server retrieves from a reference database supplementary information relevant to the current FOV. The type of supplementary information retrieved and the format of the information can take many forms, depending upon the specific application. Most preferably, the supplementary information is anchored to a specific object, surface or position in the 3D model, and includes textual data and/or graphics and/or a virtual object to be displayed in a corresponding position (location and orientation) in the AR display.

The supplementary information may be retrieved from many different sources. According to one preferred but non-limiting option, the retrieved supplementary information is retrieved from layers 88 and 90 of database 34, described above, or from one or more dedicated databases of AR supplementary information. Alternatively or additionally, supplementary information may be obtained by searching a wide range of sources of online geo-tagged data and/or networked systems which have available data about the geographic presence of connected users. In certain cases, some or all of the supplementary information may be preloaded in the mobile device.

The supplementary information is preferably retrieved selectively according to one or more of a number of parameters. Firstly, information is preferably only retrieved if it either falls within the current FOV or sufficiently close thereto that it would be likely to be useful for display in the case of moderate camera motion which could be tracked by the mobile device.

Secondly, even within the FOV, in some applications it may be desired to suppress, or allow user-selected suppression of, data according to the distance of the corresponding objects from the mobile device. For example, in some cases, it is desirable to suppress excess details in the far-field of the viewed scene where image resolution is insufficient to visually resolve the information. Conversely, in other applications, it may be advantageous to give precedence to major features or locations visible in the distance while avoiding distractions or obscuring of information by display of information about proximal objects.

Thirdly, the type of information selected for display is typically a function of the intended application and/or options selected by each user.

At step 72, the server preferably determines parameters of how each item of supplementary information should appear in the current FOV of the camera. Primarily, this typically includes a pixel location within the uploaded image for display of items of supplementary information within the image.

According to certain preferred embodiments, the supplementary information is also processed so as to merge intuitively into the real scene as viewed by the current FOV of the mobile device. Thus, for example, if the supplementary information is a textual label or graphic element associated with a surface of the 3D model, the form is preferably conformed (warped) to appear as if it is a surface in 3D being viewed at the angle of the corresponding surface in the current FOV. Similarly, if the supplementary information is a virtual object, it is rotated to provide the appropriate viewpoint for merging into the real scene according to the current FOV. The form is preferably also scaled in order to appear correctly sized for the range of the object in the image, although scaling-down may be limited in order to preserve readability for labels on distant objects. The manipulation of graphic forms may be performed by the server to generate a display-ready 2D form for download to the mobile device. Thus the server side processing according to certain embodiments of the invention allows display of the supplementary information at the mobile device correctly sized and oriented within the current view while minimizing any additional processing burden on the client side. Alternatively, the server may simply determine parameters according to which the supplementary information should be conformed for view within the current FOV, and the actual graphic manipulation may be performed by a graphics processor of processing system 22 of the mobile device.

Then, at step 74, the server transmits to the mobile device data indicative of the pixel location for display of the supplementary information, preferably together with either the 2D form or parameters for generating the correct form of a graphic element for display by the client side according to steps 50-54, as described above. The graphic content can then be displayed so that it substantially conforms to an apparent orientation of the object to which the supplementary information relates.

Optionally, if updated information becomes available to the server which is relevant to the current FOV subsequent to step 72, i.e., between successive re-registration requests, the server may be configured to poke the client with the updated information, allowing real-time update of information, such as labeling of a moving object appearing in the FOV.

Embodiments of the present invention may be used to advantage in a wide range of applications. A small and non-limited selection of examples is as follows:

Indicating to the user the location of a restaurant in the 3rd floor of a building, and identifying the corresponding entrance to the building.

Providing a self-guided tour of a city, including retrieving the history and narrative story relating to buildings or monuments seen during the tour.

Providing a navigation aid in which arrows or other symbols indicating a desired route are superimposed on the real scene.

Providing a support tool for rescue forces, displaying the location of the entrance to a building, and the location of water pipes and other infrastructure.

Displaying a label locating my friend, John, (who also has a mobile device, and whose position is therefore known to the server) in the midst of a crowd of 50,000 people at a soccer match.

In each of these applications, functionality and performance are typically greatly enhanced by employing image-to-model registration to achieve registration precision which may approach the limits of the available image resolution.

Additional implementation options include, but are not limited to:

providing spoken or other audio content to accompany the current display, preferably associated with a currently-displayed graphic element designating the corresponding viewed object;

providing additional, more detailed, graphic content, or cycling through a sequence of different supplementary information, or information about different objects within a field of view, if the user dwells on a given scene for more than a given amount of time;

providing arrows or other direction indicators relating to points of interest lying outside the current field of view as a prompt to the user turning towards those points of interest.

Figure 4:
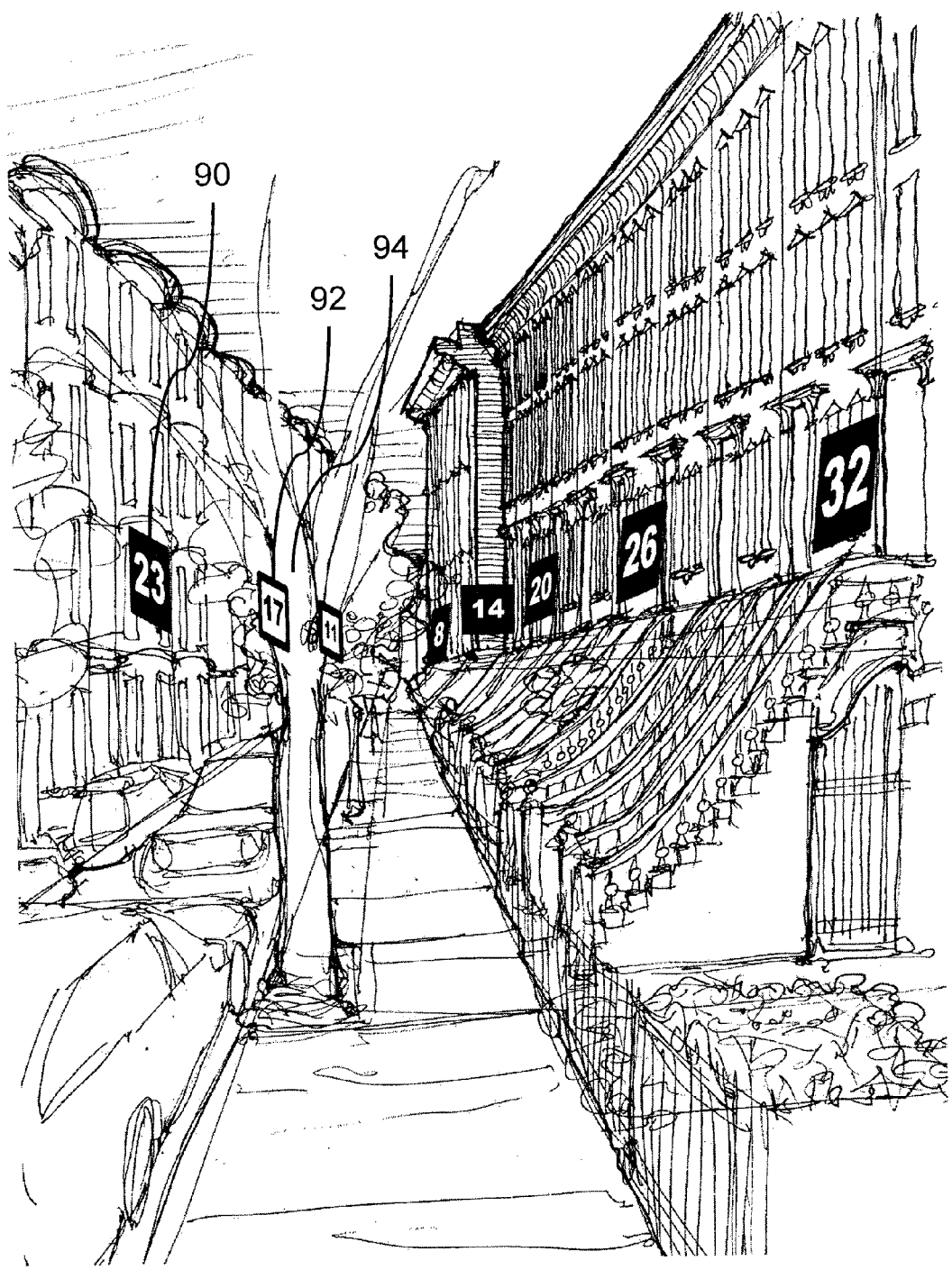
FIG. 4 is a schematic illustration of an augmented reality display according to an embodiment of the present invention.

FIG. 4 illustrates schematically an example of a display generated according to an embodiment of the present invention. In this case, a view of a street is supplemented with numerical labels 90 which indicate the building numbers of buildings within the FOV. It will be noted that, in the preferred implementation illustrated here, labels 90 are conformed to the orientation of the front surfaces of the buildings, such that the label for building "32" appears to be applied to the front of a building on the right side of the image facing to the left while the label for building "23" appears applied to the front of a building on the left side of the image facing towards the right. Similarly, the labels are scaled according to the distance of the object from the camera, with the label for distant building "8" much smaller than that of building "32" in the foreground.

As mentioned earlier, the mobile device preferably continues to perform motion tracking between successive frames of the image and adjusts the position of the labels 90 to maintain alignment between the labels and the corresponding objects in the image. When tracking quality becomes diminished, the registration process is repeated and the AR supplementary information updated where necessary.

A further feature of certain implementations of the invention illustrated here is the ability to display information relating to objects currently hidden from view. In this illustration, a tree 94 obscures a number of buildings on the left side of the street. However, the registration processing of the sampled image to the 3D model performed by the server still allows retrieval of such information, which can optionally be displayed using distinctive labels, in this case shown as inverted color labels 92 (using black on white rather than white on black), to inform the user that they refer to objects currently obscured.

It should be noted that the registration of the sampled images to a 3D model may be used to provide various additional functionality to the mobile device, in addition to, or instead of, the augmented reality display. Two examples believed to be of particular importance in this respect are operation as a passive range-finder and as a GPS-independent location tracker.

Specifically, referring first to the passive range-finder, this refers to functionality according to which a range measurement can be obtained from the current position to any location within a viewed scene without directing any active illumination towards that location. Instead, once the current view is registered to the 3D model, range information from the current position to any selected location in the FOV can be derived directly from the model. According to a first implementation of this feature, a map of ranges to each pixel of the image can be downloaded from the server to the mobile device at the end of the registration process, essentially generating a simulated LADAR image of the viewed scene. The range information is then available instantly on demand. In an alternative implementation, a request for range information at a particular pixel may be entered by the user, and the mobile device then uploads an identifier of the corresponding pixel in the last registered image to the server. The server then employs the registration transformation to determine the corresponding point on the model, and hence determine the distance from the current viewing location to the requested point. Parenthetically, as a further function according to this second approach, the server may also be queried for a distance between any two locations within the viewed scene. In this case, both locations are identified by selecting a corresponding image pixel, and the distance between the corresponding locations are derived from the model. In most cases, the range-finder functions are most accurate if the mobile device has not moved significantly since the last registered image was sampled, although this limitation may be relaxed to a certain extent where data is available about ego motion of the mobile device, such as when SLAM processing is used.

Turning now to the GPS-independent location tracker, given that the registration of the uploaded image to the 3D model in most cases inherently also solves the camera position, the image registration processing can be used to provide a mobile device with a position determination relative to the geographically anchored 3D model. This allows verification, correction and tracking of self-position even in circumstances that GPS data is unavailable. According to one implementation of this feature, the coordinate location and compass bearing and/or orientation may be provided from the server to the mobile device after each successful image registration, for display to the user or for use in any desired further processing at the mobile device. Optionally, where SLAM techniques are used for the local tracking, the result of the processing may also be used to provide real-time updating of the position data until the next full registration is performed. Alternatively, or additionally, onboard inertial sensors may be used to provide intermediate updates to position data during the time between full image registrations.

Figure 5:
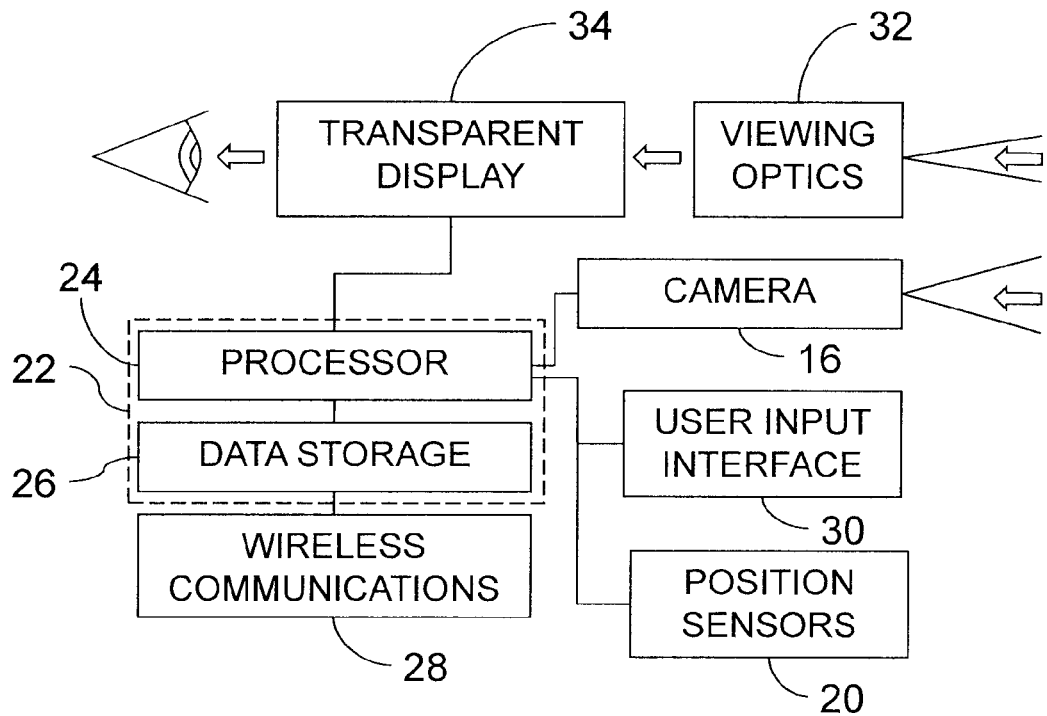
FIG. 5 is a schematic block diagram of a variant implementation of the mobile device of FIG. 1.
Figure 6:
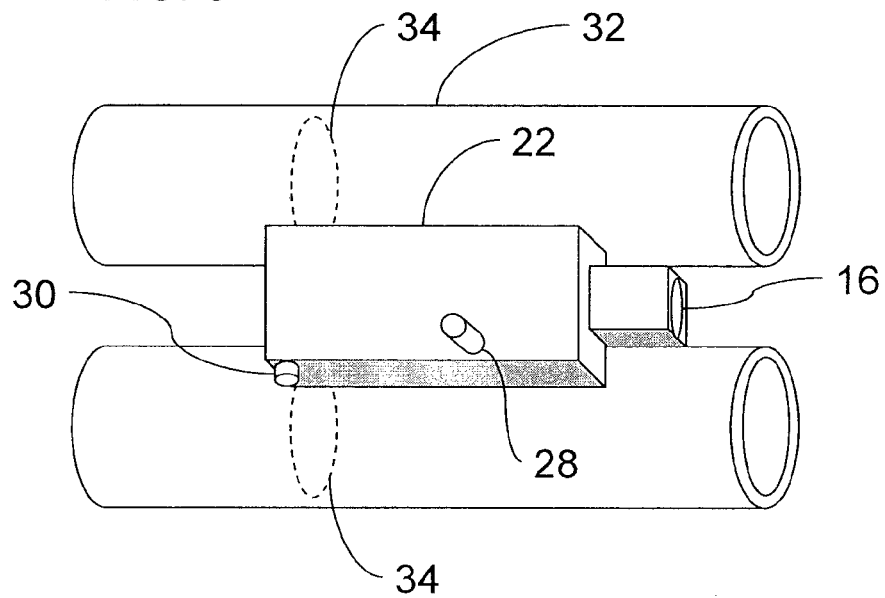
FIG. 6 is a schematic isometric view of an implementation of the device of FIG. 5.

Turning now to FIGS. 5 and 6, there is illustrated a subcategory of the mobile devices illustrated generically in FIG. 1, believed to be of particular significance in their own right. This subcategory of devices relates primarily to devices employing a transparent display, and preferably including also magnifying optical arrangements, as exemplified in FIG. 6 by a pair of binoculars. Components which are functionally equivalent to those already described above are labeled similarly. These include camera 16, processing system 22 with at least one processor 24 and data storage 26, position sensors 20, user input interface 30 and wireless communications module 28.

This class of products may alternatively be defined by the fact that their mode of use is to view the scene by the user looking along an axis coincident with, or parallel to, the optical axis of an optical arrangement (viewing optics 32) directed towards the scene being viewed. This class of devices thus also includes various types of night vision goggles and the like. The devices typically employ a transparent display 34, as mentioned earlier. Camera 16 is preferably aligned with its optical axis parallel to that of viewing optics 32, although the field of view of camera 16 need not be the same as that of the viewing optics, and may advantageously be wider to facilitate the registration process.

By implementing a mobile device according to this aspect of the present invention, it is possible to provide common devices such as binoculars, a telescope (including a monocular), night vision goggles etc. with a range of added-value functions, including one or more of: augmented reality display features; passive range-finder functionality; and non-GPS position tracking functionality, all as described above.

Also falling within the scope of an embodiment of the present invention is a simplified device which does not include a transparent display, but rather only a simple alphanumeric LCD display. By performing registration of images from camera 16 against a 3D model, actuation of a user input (e.g., one or more button) 30 initiates the aforementioned passive range-finder function and/or the aforementioned non-GPS position finding functionality described above, with the results of measurements being displayed as data on the alphanumeric display. Designation of a location in the viewed scene for the range-finder function is preferably achieved by aligning a cross-hair or other designation symbol defined by the viewing optics.

In a variant implementation, this device may be implemented with at least part of the 3D model stored in local data storage device 26 and with the image registration processing performed locally by processing system 22. Although such an embodiment requires considerably greater on-board processing power, this may be justified in cases where it is important to provide an autonomous device which can continue functioning without ongoing wireless communications. In certain embodiments, wireless communications module 28 may be omitted altogether, and the 3D model may be loaded into data storage device 26 in another manner, such as by insertion of a removable storage device pre-loaded with the 3D model data, or by temporary wired connection to a computer or network.

It will be appreciated that the above descriptions are intended only to serve as examples, and that many other embodiments are possible within the scope of the present invention as defined in the appended claims.

What is claimed is:

1. A method of operating a mobile device to provide a display of supplementary information aligned with a view of a scene, the mobile device including a camera, a display, at least one processor and at least one position sensor, the mobile device being in networked communication via a mobile network with a remote server, the method comprising the steps of:

(a) obtaining a first image from the camera;
 (b) uploading at least said first image via the mobile network to the remote server together with corresponding data from the at least one position sensor;

(c) performing image processing to track image motion between said first image and subsequent images obtained from the camera, and hence determining a mapping between features of a reference image and features of a current image obtained from the camera, said reference image being selected from the group consisting of: said first image; and a second image for which transformation parameters were uploaded to the server corresponding to a mapping between said first image and said second image, said processing being performed by the at least one processor of the mobile device;

(d) receiving via the mobile network data indicative of a pixel location for display of supplementary information within said reference image, said receiving including receiving data indicative of a pixel location for display of supplementary information relating to an object obscured from view;

(e) employing said mapping to determine a corresponding pixel location for display of the supplementary information within the current image; and (f) displaying the supplementary information on the display correctly aligned with the view of the scene.

2. The method of claim 1, wherein said mapping is a global spatial transformation approximating said image motion.

3. The method of claim 1, wherein said mapping is an optical flow mapping.

4. The method of claim 1, wherein said mapping is derived by simultaneous localization and mapping (SLAM) processing of said images.

5. The method of claim 1, wherein said displaying includes displaying the supplementary information overlying an image of the view of the scene on a non-transparent display.

6. The method of claim 1, wherein said displaying includes displaying the supplementary information on a transparent display aligned with a direct view of the scene.

7. The method of claim 1, wherein said receiving includes receiving data indicative of a graphic form for display of the supplementary information.

8. The method of claim 1, wherein said pixel location for display of supplementary information received by the mobile device is derived at least in part by matching of said first image to a three dimensional model of the scene.

9. The method of claim 1, wherein said image processing is continued after said displaying to generate an updated mapping for a new current image, and wherein said pixel location for display of the supplementary information within the current image is updated according to said updated mapping.

10. The method of claim 1, further comprising the steps of:
(a) inputting from a user a request for information regarding a pixel location in the current image;
(b) employing said mapping to derive a corresponding pixel location in said reference image; and
(c) transmitting to the server a request for information regarding the pixel location in said reference image.

11. The method of claim 10, wherein said request for information is a request for range information relating to a viewed location.

12. The method of claim 1, further comprising the steps of:
(a) evaluating a tracking reliability indicator based upon at least one parameter selected from the group consisting of: elapsed time since sampling of said first image; degree of overlap between the current image and said first image; and number of tracked features in common between the current image and said first image; and
(b) when said tracking reliability indicator passes a threshold, uploading a new reference image obtained from the camera to the server.

13. A mobile device for providing a display of supplementary information aligned with a view of a scene, the mobile device comprising:
(a) a camera;
(b) a display;
(c) at least one position sensor;
(d) a communication module for networked communication to a remote server; and
(e) a processing system including at least one processor, said processing system being in data communication with said camera, said display, said at least one position sensor and said communication module, said processing system being configured to implement the method of claim 1.

14. The mobile device of claim 13, wherein the mobile device is implemented as a device selected from the group consisting of: an augmented reality headset; binoculars; a telescope; and night vision goggles.

15. The mobile device of claim 13, wherein the mobile device is implemented as a device selected from the group consisting of: a cellular telephone; a hand-held computer; a navigation device; a personal digital assistant; and a digital camera.

16. A method of operating a mobile device to provide a display of supplementary information aligned with a view of a scene, the mobile device including a camera, a display, at least one processor and at least one position sensor, the mobile device being in networked communication via a mobile network with a remote server, the method comprising the steps of:
(a) obtaining a first image from the camera;
(b) uploading at least said first image via the mobile network to the remote server together with corresponding data from the at least one position sensor;
(c) performing image processing to track image motion between said first image and subsequent images obtained from the camera, and hence determining a mapping between features of a reference image and features of a current image obtained from the camera, said reference image being selected from the group consisting of: said first image; and a second image for which transformation parameters were uploaded to the server corresponding to a mapping between said first image and said second image, said processing being performed by the at least one processor of the mobile device;
(d) receiving via the mobile network data indicative of a pixel location for display of supplementary information within said reference image;
(e) employing said mapping to determine a corresponding pixel location for display of the supplementary information within the current image;
(f) displaying the supplementary information on the display correctly aligned with the view of the scene;
(g) evaluating a tracking reliability indicator based upon at least one parameter selected from the group consisting of: elapsed time since sampling of said first image; degree of overlap between the current image and said first image; and number of tracked features in common between the current image and said first image; and
(h) when said tracking reliability indicator passes a threshold, uploading a new reference image obtained from the camera to the server.

17. A mobile device for providing a display of supplementary information aligned with a view of a scene, the mobile device comprising:
(a) a camera;
(b) a display;

(c) at least one position sensor;
(d) a communication module for networked communication to a remote server; and
(e) a processing system including at least one processor, said processing system being in data communication with said camera, said display, said at least one position sensor and said communication module, said processing system being configured to implement the method of claim 16.

18. The mobile device of claim 17, wherein the mobile device is implemented as a device selected from the group consisting of: an augmented reality headset; binoculars; a telescope; and night vision goggles.

19. The mobile device of claim 17, wherein the mobile device is implemented as a device selected from the group consisting of: a cellular telephone; a hand-held computer; a navigation device; a personal digital assistant; and a digital camera.

* * * * *